Nov. 2, 1965                E. KEIM ETAL                3,215,240
                    AUTOMATIC TICKET SELLING MACHINE
Filed Oct. 1, 1963                                    8 Sheets-Sheet 1

Nov. 2, 1965  E. KEIM ETAL  3,215,240
AUTOMATIC TICKET SELLING MACHINE
Filed Oct. 1, 1963  8 Sheets-Sheet 5

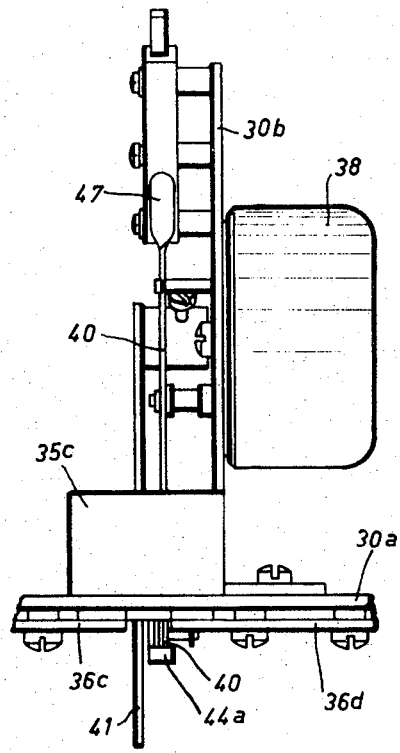

United States Patent Office 3,215,240
Patented Nov. 2, 1965

3,215,240
AUTOMATIC TICKET SELLING MACHINE
Ernest Keim, Meyrin, Geneva, and Theodore Dietrich, Geneva, Switzerland, assignors to Sodeco Société des Compteurs de Genève, Geneva, Switzerland, a firm
Filed Oct. 1, 1963, Ser. No. 313,060
Claims priority, application Switzerland, Oct. 4, 1962, 11,661/62
7 Claims. (Cl. 194—2)

Automatic ticket selling machines are known in which coins corresponding exactly to the amount of the ticket price must be inserted in order to obtain the ticket. This entails the disadvantage that the purchaser must be in possession of corresponding quantities of small coins, or must first obtain change elsewhere.

The invention is based on the task of obviating this disadvantage on the basis of an automatic selling machine issuing tickets and having a keyboard each key of which corresponds to a determined ticket and can be operated by the purchaser, having means for storing the price corresponding to the selected ticket, having an insertion device for coins, a ticket issuing device and means for counting the amount of money corresponding to the coins inserted, the invention is characterised by means for comparing the price recorded by the storage means with the amount of money inserted by the purchaser, by a ticket issuing device controlled by said comparison means and coming into operation only when the amount inserted is at least equal to the price of the ticket, and by an automatic change-giving device which returns any sum exceeding the price of the ticket.

The invention is explained more fully with one example of its performance with the aid of the drawings, in which.

Figure 2:
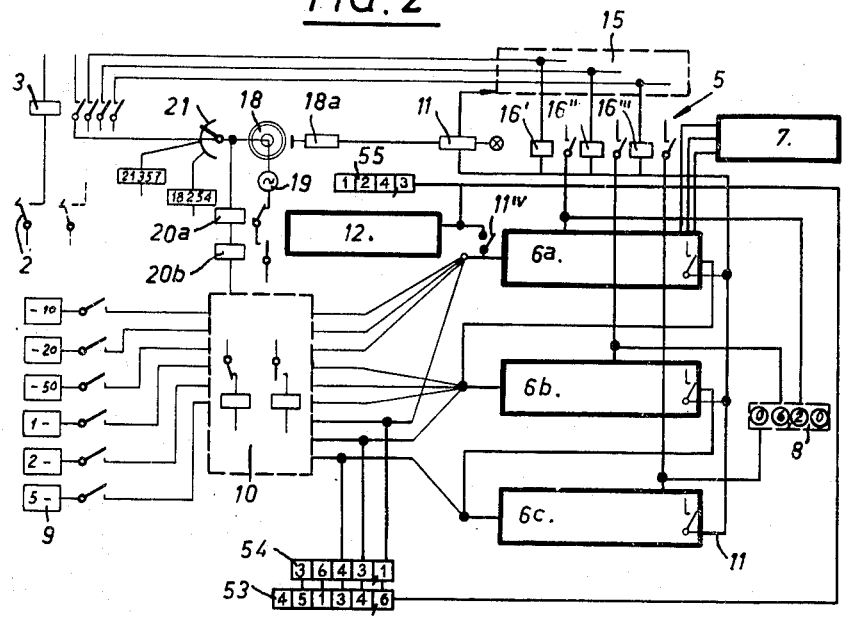
FIGURE 2 is a block wiring diagram of the automatic machine.
Figure 3:
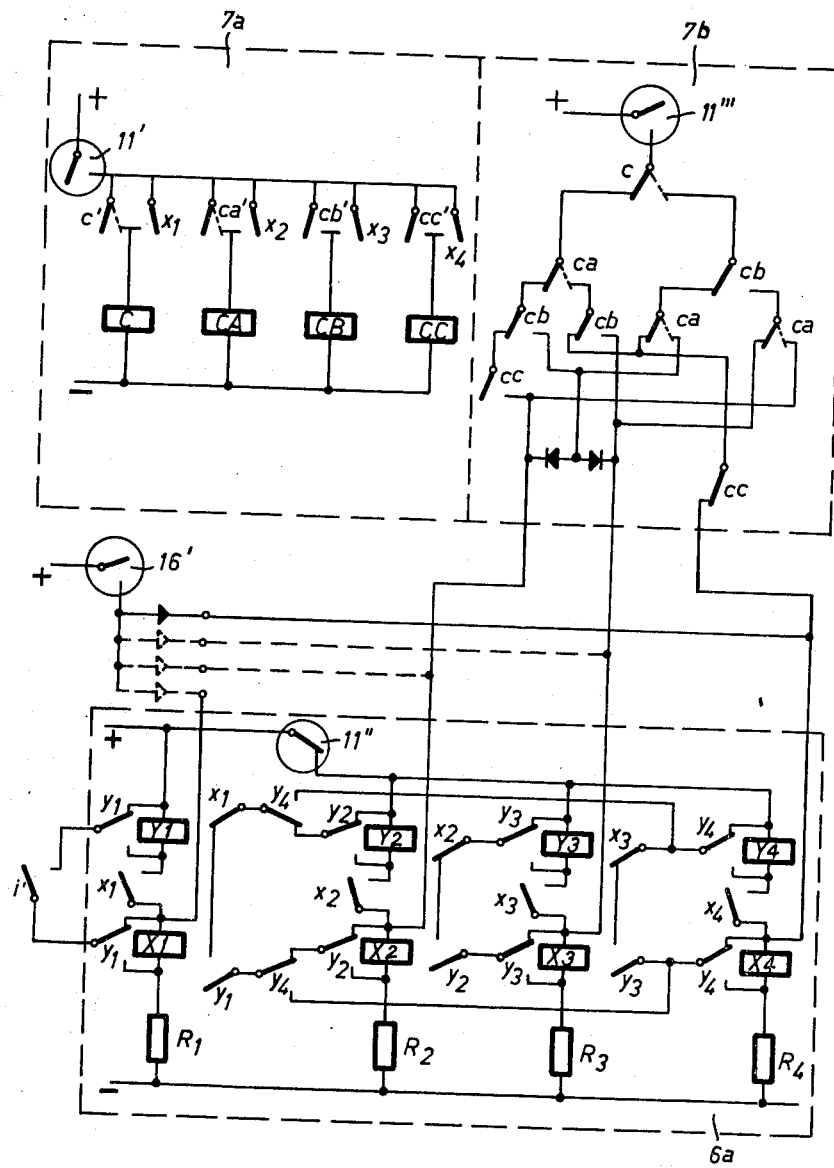
Figure 4:
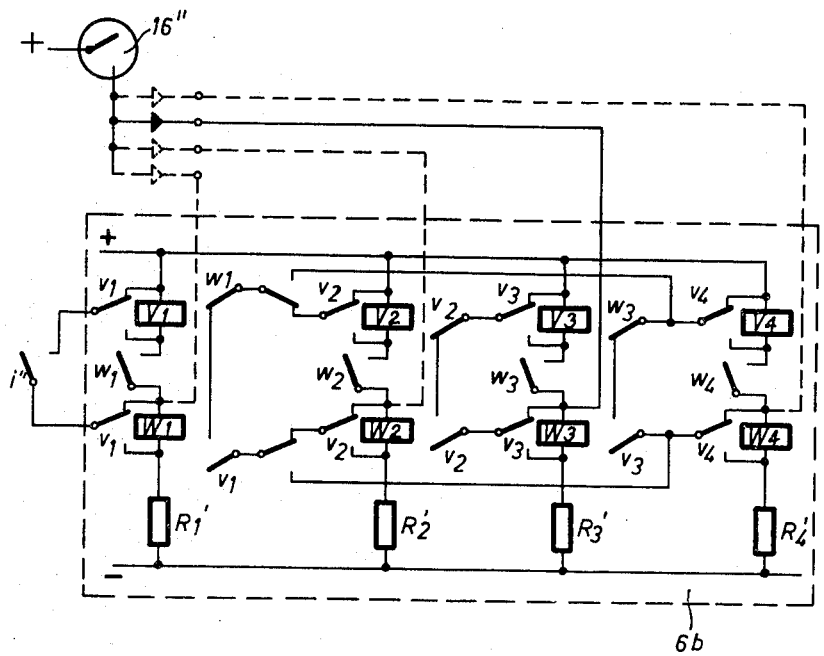
Figure 12:
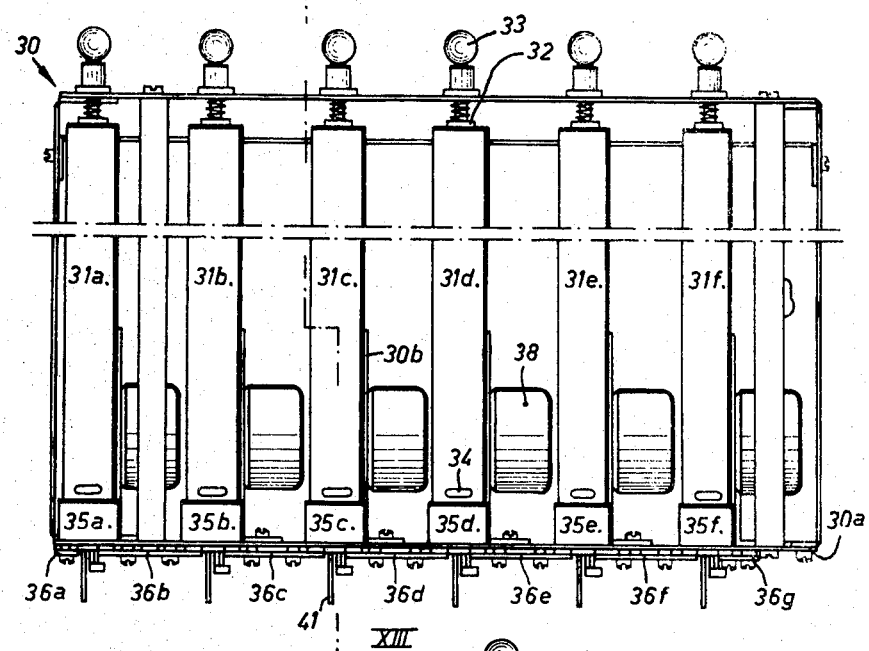
Figure 13:
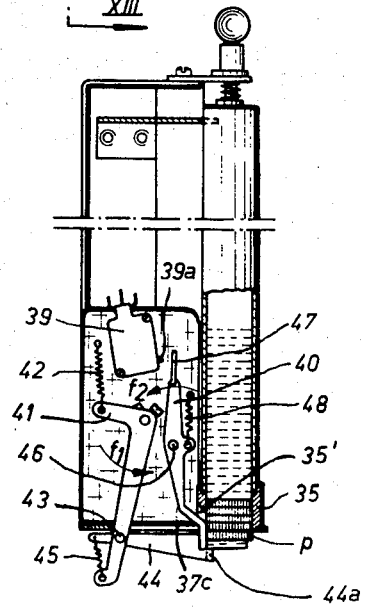
Figure 16:
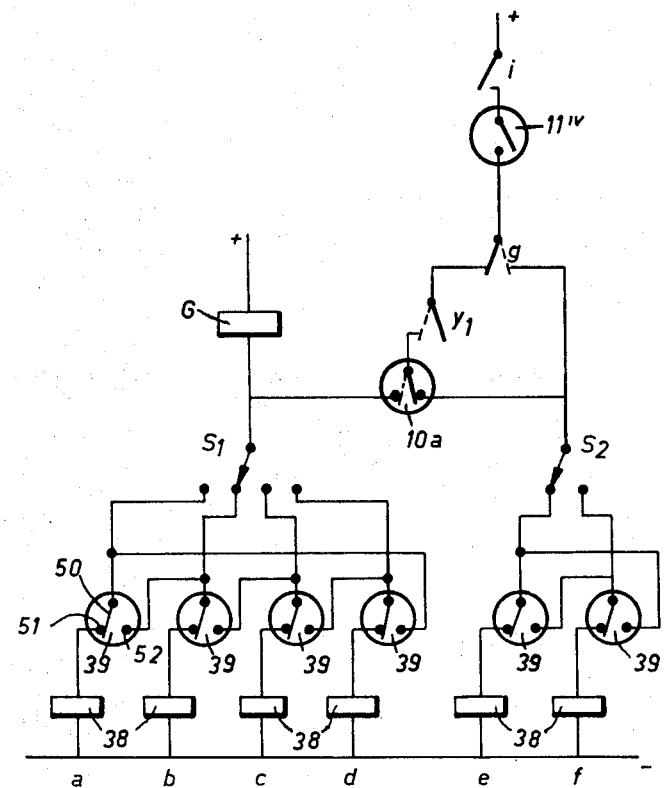

FIGURES 3 and 4 details of the wiring diagram shown in FIGURE 2,

FIGURES 5 to 11 show diagrams which illustrate the operation of the individual storage elements, FIGURE 12 shows an elevation of the change-giving device, FIGURE 13 a section on the line XIII—XIII in FIGURE 12, FIGURES 14 and 15 show elevations of a detail according to FIGURE 13, on a larger scale, and FIGURE 16 a wiring diagram of the change-giving device according to FIGURE 12.

Figure 1:
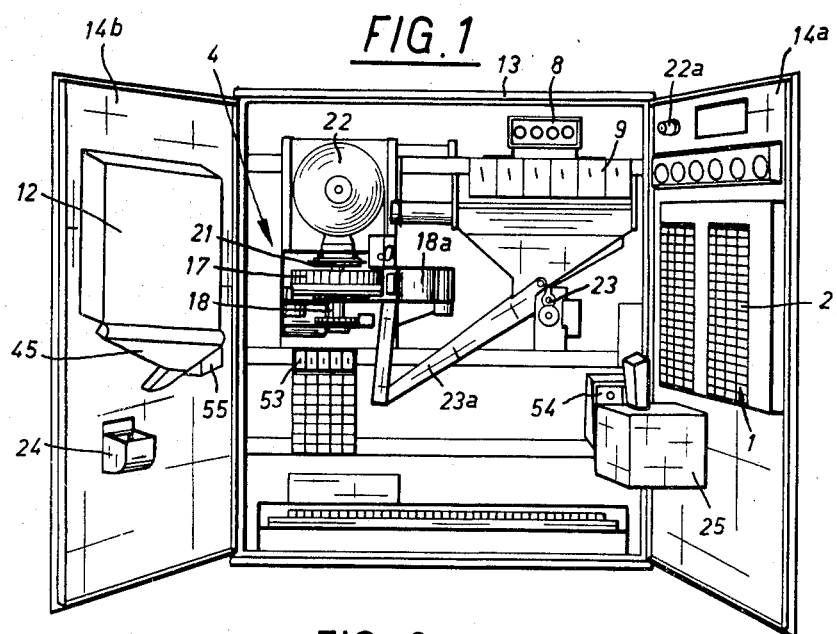
FIGURE 1 is an elevation of the opened automatic machine.

The automatic selling machine illustrated in FIGURE 1 has a keyboard 1, the keys 2 of which correspond to the desired tickets and have to be operated by the purchaser. Each of the keys controls a relay 3 (FIGURE 2) which is connected on the one hand to a printing device 4 for the tickets and on the other hand to a relay system 5 for determining prices. The automatic machine also has a storage means consisting of the three relay chains 6a, 6b, and 6c, a switch system 7 connected to the relay chain 6a, an indicator device 8 (FIGURE 1), a device 9 for the insertion and testing of coins and transmitting the result of the testing to the control means 10, a verification unit 11, and a change-giving device 12. All the structural units are disposed in a cabinet 13 which in FIGURE 1 is illustrated in the open position; the inner wall of one cabinet door 14a carries the keyboard 1, while the change-giving device 12 is disposed on the other cabinet door 14b.

The relays 3 are connected to the relay system 5 through a distributor plate 15 which carries the individual terminals of the relays 16', 16'', 16''' and so on (the number naturally not being restricted to three) belonging to the relay system 5, which are known as the price relays. These price relays convert the information received from the relay 3 into the purchase price for the desired ticket. This is achieved by the fact that each price relay controls the excitation of one or more relays of the storage means in which a determined amount is allocated to each storage relay.

The storage chain 6a permits the storage of amounts between 0 and 0.9 francs, the chain 6b the storage of amounts between 0 and 9.00 francs, and the chain 6c the storage of amounts between 0 and 90.00 francs; when the system is restricted to three price relays and three storage chains as in the embodiment described as an example, amounts up to a maximum of 99.90 francs can thus be stored.

Each storage chain 6a, 6b, or 6c has, as illustrated in FIGURE 3, four pairs of relays X1, Y1 to X4, Y4; V1, W1 to V4, W4 (FIGURE 4); and T1, U1 to T4, U4 respectively. When excited, each pair of relays represents the complement of a determined binary number. A plurality of pairs of relays may be excited simultaneously, thus permitting the storage of a number which is equal to the sum of the complements which correspond to the respective pairs of relays. For each amount which can be stored by the various chains of relays, the following table indicates the relays excited in order to represent the respective amount:

Chain 6a 0.1 $X_1+X_4/Y_1+Y_4$
0.2 $X_4/Y_4$
0.3 $X_1+X_2+X_3/Y_1+Y_2+Y_3$
0.4 $X_2+X_3/Y_2+Y_3$
0.5 $X_1+X_3/Y_1+_3$
0.6 $X_3/Y_3$
0.7 $X_1+X_2/Y_1+Y_2$
0.8 $X_2/Y_2$
0.9 $X_1/Y_1$
0.0 —/—

Chain 6b

1 $V_1+V_4/W_1+W_4$
2 $V_4/W_4$
3 $V_1+V_2+V_3/W_1+W_2+W_3$
4 $V_2+V_3/W_2+W_3$
5 $V_1+V_3/W_1+W_3$
6 $V_3/W_3$
7 $V_1+V_2/W_1+W_2$
8 $V_2/W_2$
9 $V_1/W_1$
0 —/—

Chain 6c

10 $T_1+T_4/U_1+U_4$
20 $T_4/U_4$
30 $T_1+T_2+T_3/U_1+U_2+U_3$
40 $T_2+T_3/U_2+U_3$
50 $T_1+T_3/U_1+U_3$
60 $T_3/U_3$
70 $T_1+T_2/U_1+U_2$
80 $T_2/U_2$
90 $T_1/U_1$
0 —/—

The movable contact of the price relays 16 which control the storage of the price for the desired tickets is connected to the corresponding storage relays; if for example the price of the ticket is 6.20 francs, the relay 16' is connected direct to the relay pair $X_4, Y_4$, and the relay 16'' to the relay pair $X_3, Y_3$, while the third price relay 16''' excites none of the relays of the storage chain 6c.

The systems illustrated in FIGURE 3 for the chain $6a$ and in FIGURE 4 for the identical chains $6b$ and $6c$ are known in themselves and need not be described more fully here. Their function is based on the principle of an excitation sequence and on the short-circuiting of the various relays $X_1$ to $X_4$, while one of the contains $x_1$ to $x_3$ of these relays determines the closing of the supply circuit of the following relay X when this contact's own control relay is short-circuited.

Figure 5:
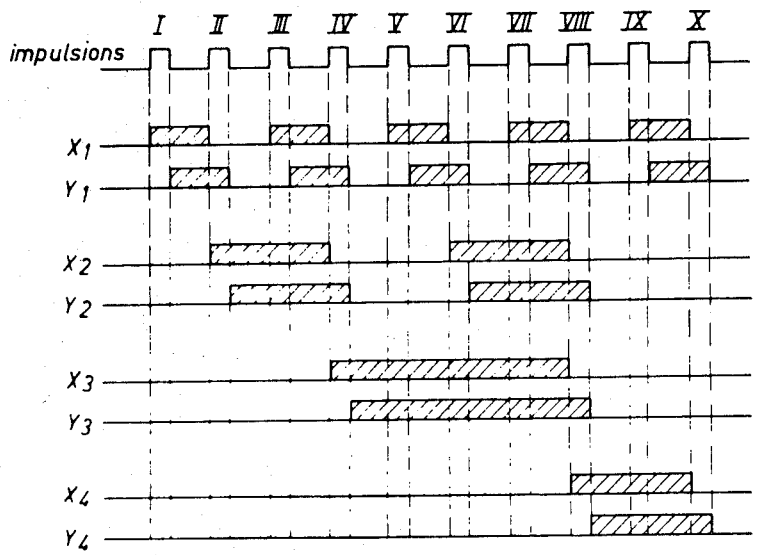
Figure 7:
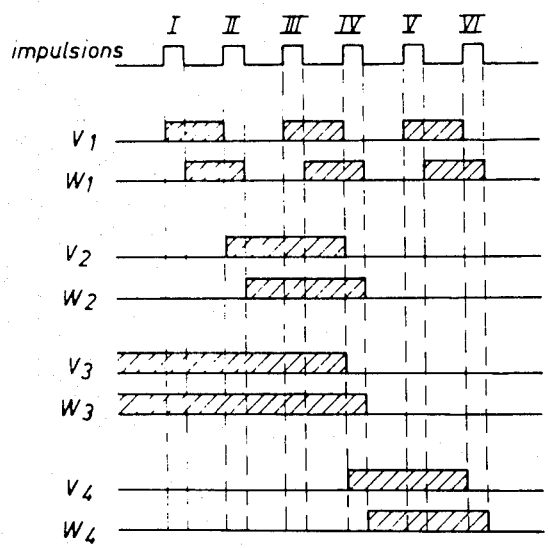
Figure 8:
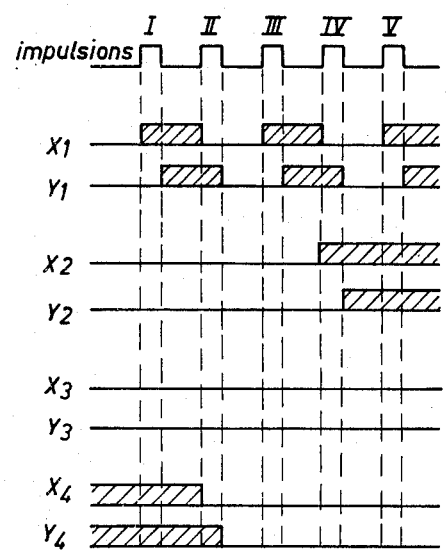
Figure 9:
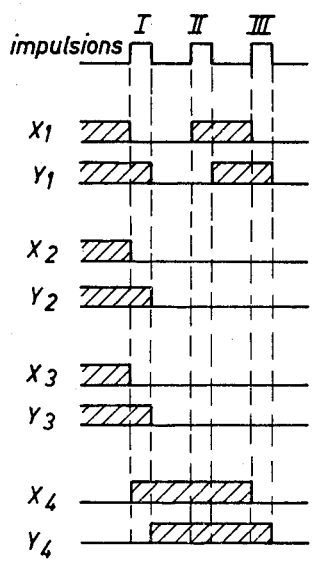
Figure 10:
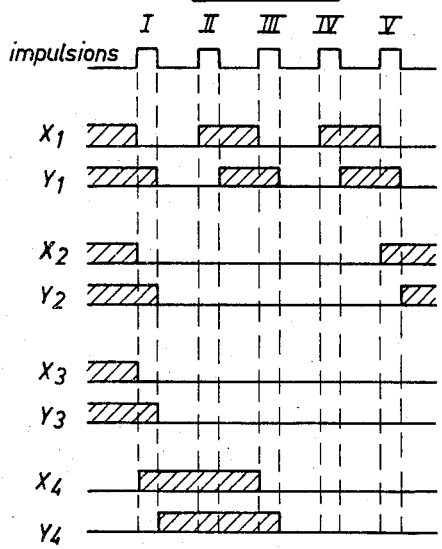
Figure 11:
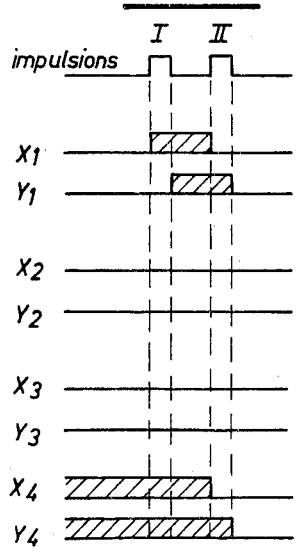

In FIGURE 5 the time sequence of excitation of the different relays of the chain $6a$ is illustrated as obtained on the basis of impulses which are fed to the relay chain through an impulse generator $i''$ not illustrated in the drawings. On the first line in FIGURE 5 the impulses received are plotted against time; in the present case ten impulses I–X were received. On the lines situated therebeneath the hatched rectangles designate the excitation times of the different relays in dependence on the incoming impulse sequence.

The amount stored appears on an indicator device disposed in the upper portion of the cabinet 13 and having four windows; behind each window are situated for example neon tubes which are equipped with ten electrodes in the shape of the numerals 0–9. Each of these electrodes is connected in accordance with FIGURE 2 to those relays of the storage chains $6a$ to $6c$ which correspond to the respective numerical value.

The apparatus for printing tickets and which can for example be of similar construction to that described in Swiss patent application No. 646/61, comprises printing blocks 17 which correspond to the different impressions on the desired tickets and which are disposed on a turntable 18 driven by a motor 19. The relays $20a$ and $20b$ shown in FIGURE 2 serve for controlling the starting and stopping of the motor; in addition, a reel of paper 20 is provided for the tickets to be printed and issued and an inking mechanism $18a$ is also provided. The motor relays $20a$ and $20b$ are controlled by a selector 21 which has as many contacts as there are printing blocks. These contacts are connected to the corresponding relays 3. The first coin inserted into the insertion device 9 effects the closing of the relay $20b$, whereby the excitation circuit of the motor 19 is closed. If the printing block corresponding to the ticket selected is situated opposite the inking mechanism $18a$, the selector 21 controls the relay $20a$, whereby the motor and the printing block turntable are stopped.

The ticket is printed and issued only if the amount inserted by the purchaser in the form of coins is equal to the purchase price of the ticket or a maximum of 0.90 francs greater than that purchase price.

If the amount of coins introduced corresponds to the above mentioned requirements, the control device 11 for this purpose operates the printing device 4 and where applicable the change-giving device 12 as will be explained more fully later on.

If the amount inserted exceeds the value of 0.90 francs, the control device 11 prevents the printing of the ticket and enables a control device, designated by $22a$ in FIGURE 1, to be operated by hand; a valve flap 23 (such as described fully in Swiss patent application No. 646/61) can thereby be operated and allows the excess coins to drop through a passage $23a$ into a receptacle 24 from which the purchaser can remove them.

When the amount injected corresponds to the purchase price or is at most 0.90 francs greater than the latter, the same clack valve 23 on the other hand has the effect of conducting the coins into a till 25 which is disposed on the inside wall of the cabinet door $14a$.

If the amount represented by the coins inserted is smaller than the stored purchase price, after a determined previously adjustable time, for example after 50 seconds, the verification device 11 effects the opening of the valve flap 23 and hence the return of all coins inserted; at the same time the stored information regarding purchase price is cancelled, for example with the aid of time relays (not illustrated). The same cancelling relays come into action if after operation of a key no coins are inserted within a determined period of time.

In the event of failure of the feed voltage, for example in the case of mains failure or reduction of the voltage beneath the value required for the reliable operation of the automatic machine, control relays (not illustrated) and capacitors (likewise not illustrated) which are permanently connected to the mains ensure that in all cases sufficient electric power will still be available to operate the valve flap 23 and return to the purchaser the money already inserted.

The change-giving device 12 consists as illustrated in FIGURE 12 of a box 30 in which there are inserted six transparent tubes $31a$–$31f$ which are filled with coins for change. For example, the tubes $31a$ and $31d$ contain 20 centime pieces and the tubes $31e$ and $31f$ ten 10 centime pieces. These coin tubes are inserted at the bottom into the sleeves $35a$ to $35f$ and at their tops are held by pressure means 33 which engage in the rings 32 on the top of the tubes. At the bottom end, shortly above the sleeves the coin tubes are closed by means of a U-shaped bow 34 (FIGURE 15) which is pushed through corresponding openings in the wall of the coin tube and in turn has a small aperture $34a$ on its projecting part in order that the respective coin tube when full can be firmly closed by means of a locking device or seal (not illustrated) pushed through said small opening, for example during transport. When the tubes have been installed in their vertical position between the pressure means 33 and the sleeves 35, the bows 34 can simply be removed, breaking the seal.

On the bottom horizontal wall part $30a$ on which the sleeves 35 are disposed, plates $36a$ to $36g$ are fastened at a determined distance apart, corresponding exactly to the thickness of the corresponding coin. The ends of the plates 36 partly project in each case beneath the opening of the sleeves 35 and are a distance apart which corresponds to the width of a gap $37c$ (FIGURE 13, FIGURE 15) cut in the wall part $30a$ at the side of each sleeve. On the wall part $30a$ at the side of each coin tube angle pieces $30b$ are also fastened on the longer arm of each of which a rotary magnet 38, a switch 39 and a rocking lever 40 are mounted. When one of the electromagnets is energised, the lever 41 turns in the direction of the arrow $f1$ (FIGURE 13) against the action of the restoring spring 42 and thus through its arm projecting at the bottom out of the housing through the gap $37c$ (see FIGURE 13) moves the push rod 44 to the right parallel to the wall part $30a$. The push rod 44 is pivotally mounted on the lever 41 by means of a shaft 43 and at its short end is connected by means of a spring 45 to the projecting end of the lever 41. Irrespective of the angular position of the lever 41, the horizontal position of the push rod 44 is thus ensured. In the position of rest of the push rod 44 as illustrated in FIGURE 13, its end remote from the spring 45 is situated in the space between two neighboring plates 36, in contact with the edge of the coin $p$ situated in the lowermost position in the coin tube. When the push rod 44 is advanced owing to the energisation of the electromagnet 38, the coin $p$ is pushed out to the right in FIGURE 13 and drops into the receptacle 45 (FIGURE 1), which is disposed beneath the coin tube 31; from said receptacle the coins pass into the withdrawal receptacle 24 (FIGURE 1).

After de-energisation of the electromagnet, the push rod 44 and lever 41 resume their position of rest illustrated in FIGURE 15 owing to the action of the spring 42, so that the column of coins situated in the respective coin tube can drop out and the coin which is now in the lowermost position rests in the plate 36.

Each of the rocking levers 40 mentioned is formed by a lever which is rotatably mounted at the point 46 and the upper end of which is widened to form a blade 47.

The lower end of a rocking lever 40 lies against the stop 44a connnected to the push rod 44, under the action of the springs 48. Whenever on the energisation of the magnet the push rod 44 ejects a coin, the rocking lever 40 is thus turned in the direction of the arrow f2 in FIGURE 13 under the action of the spring 48, while however the magnitude of this rotation is only very small as long as coins are still contained in the respective coin tube, since this possible rotational movement is limited by the striking of the lower end of the rocking lever 40 against the edge of the coins which immediately drop down. On the return of the push rod 44 to its position of rest, the rocking lever 40 is also turned back into its position of rest by the aforesaid stop 44a. Only when the push rod 44 ejects the last coin contained in the coin tube is there no restriction to the rotary movement of the rocking lever 40, since its lowest end can now engage in a recess 35' in the sleeve 35. This possible rotational movement is made so great that the blade 47 presses the button 39a of the switch 39. This button operates a swinging contact 50 (FIGURE 16) which lies in the circuit of a selector switch S1 or S2 and which cooperates with the two fixed contacts 51 and 52 (FIGURE 16). One fixed contact 51 is connected to one terminal of the energising winding of the respective electromagnet 38 and the other fixed contact 52 to the swinging contact 50 of the switch 39 of the neighbouring coin tube. The swinging contact 50 of a switch 38 in this way makes the connection through the contact 51 to the energising coil of the electromagnet 38 associated with it as long as at least one coin is still contained in the respective coin tube; when however the last coin has been ejected from a coin tube, the swinging contact 50 makes the connection through the contact 52 to the following coin tube, if the latter still contains at least one coin, and otherwise makes the contact to another coin tube which is still at least partly full.

The above described automatic machine works in the following manner:

Case a

The amount inserted in coins by the purchaser is exactly equal to the price of the desired ticket.

It will be assumed that the purchaser desires for example a ticket costing 6.20 francs and for that purpose presses the corresponding key on the keyboard. The storage chains 6a and 6b only are then required for storing the amount inserted. In the chain 6a the relays X4 and Y4 (FIGURES 3 and 11) and in the chain 6b the relays V3 and W3 (FIGURES 4 and 7) are excited. Thereupon the amount of the value inserted, that is to say 6.20 francs, then appears on the indicator device 8. It will further be assumed that a 5 franc piece was first inserted. In the corresponding insertion passage the dimensions and weight of this coin are tested and an electric impulse is delivered to the control means 10 if the result of the testing is positive. The device 10 consists of an impulse generator, which in FIGURE 4 is designated by the reference $i''$. The generator transmits five impulses to the storage chain 6b and controls the closing of the relay 20b. Thereupon the motor 19 moves the printing block corresponding to the desired ticket to a position in front of the printing unit. The five generator impulses alter the position of the relays V1, W1 to V4, W4 (FIGURE 7) in the manner illustrated in such a way that at the end of the fifth impulse the relays V1, W1 and also V4, W4 are excited, while the other relays are not excited. The amount of 1.20 francs corresponding to the sum which must still be paid in order to obtain the ticket is then visible on the illuminated indicator 8.

The purchaser then inserts 1 franc, whereupon the generator 10 sends a single impulse to the chain 6b. This effects the dropping of the relays V1, W1 and W4, V4, so that this storage means is extinguished; thereupon only the sum of 0.20 francs appears in the indicator 8. The subsequent insertion of a 20-centime coin into the appropriate slot of the insertion device 9, or the insertion of two 10-centime coins then effect through the contact $i'$ (FIGURE 3) of the generator 10 the emission of two impulses to the chain 6a (FIGURE 11), the relays X1 and Y1 of which are thereby excited and thereupon, together with the relay X4 and Y4 respectively, drop once again. The storage means 6a is thus also extinguished and the value 0 then appears on the indicator device 8. The verification unit 11 then transmits the order to print the ticket, which, when it has been printed, is detached from the roll of paper 22 and drops into the withdrawal receptacle.

By means not illustrated the verification unit then ensures that the price of the ticket issued is again transmitted to the storage means and that impulses corresponding to the amount of money inserted are generated. The object of these impulses is on the one hand to record the amount of money inserted by means of a totalising counter 53 and on the other hand to record it on a list by means of a printing counter 54.

The change-giving device has not operated in the above described example.

Case b

The amount of money inserted is greater than the price of the ticket.

It will be assumed that the purchaser desired a ticket costing 6.20 francs and for this purpose he inserts a 5-franc piece, a 1-franc piece, and a 50-centime piece. The storage indication, and cancellation of the amounts are first effected in entirely the same manner as described above. The amount of 6.20 francs first appears on the indicator 8, then 1.00 francs, and finally 0.20 francs, corresponding to the sequence of the insertion of first a 5-franc piece and then a 1-franc piece. At the moment when the 50-centime piece is inserted, only the two relays X4 and Y4 are still excited, while the other relays are not excited. By the insertion of the coin the indication is extinguished. Through intermittent closing of the contact $i'$ the generator 10 transmits five impulses to the chain 6a, whereby the position of the relays (FIGURE 8) is altered in such a manner that at the end of this sequence of impulses only the relays X1 and Y1 on the one hand and relays X2 and Y2 on the other hand are excited, while the other relays remain unexcited. The verification unit 11 now comes into action and controls the switch system 7 (FIGURES 2 and 3), the contacts 11', 11'', and 11''' (FIGURE 6) are closed one after the other; through the closing of these contacts the storage circuit 7a and the circuit 7b are connected to the positive pole of a feed voltage source. The storage circuit 7a contains four relays C, CA, CB, and CC, which are excited by the relays C1, X2, X3 and X4 respectively. In the example considered only the contacts of relays X1 and X2 are closed, so that the relays C and CA are now excited in consequence of the closing of contact 11'.

The excitation of these relays C and CA effects the closing of the contact $c'$ and $ca'$ of the circuit 7a and the contacts $c$, $ca$ of the circuit 7b as shown in broken lines in FIGURE 3. When the relays C and CA are excited, the contact 11'' is opened through the verification unit. The feeding of the relays X2, Y2 to X4, Y4 of the chain 6a is thereby interrupted, so that these relays drop, while only the relays X1 and Y1 remain excited. The relays C and CA likewise remain excited, because through the contact $c'$ and $ca'$ they are still connected to the positive pole of the voltage source through the contact 11' of the verification unit 11.

Figure 6:
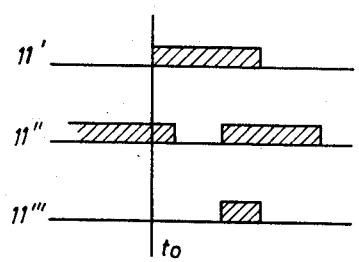

As illustrated in FIGURE 3, the contacts $c$ and $ca$ of the circuit 7b are so disposed that on the closing of the contact 11''', which in accordance with FIGURE 6 occurs simultaneously with the closing of the contact 11'', the relays X2, Y2 and X3, Y3 are again excited. Together with the relays X1, Y1, the condition of excitation of which has of course not varied during the operation of the switch system 7, they thus constitute the sum which has to be refunded to the purchaser, since they represent the complement to the amount which was stored after the insertion of the 50-centime piece and after the transmission of five impulses to the chain 6a. This sum of 0.70 francs (relays X1, Y1 and X2, Y2) is therefore equivalent to the sum of 0.30 francs to be refunded.

The verification unit 11 now controls the opening of the contacts 11', 11''' and also the transmission of repayment impulses to the chain 6a.

These are likewise transmitted to the change-giving device 12, namely through the four contacts 11^IV, g, y1, and 10a (FIGURE 16). The contact 11^IV, the closing of which is thus controlled by the verification unit 11, is therefore closed only when a sum has to be repaid to the purchaser. The contact g which is controlled by a relay G remains in the position illustrated in FIGURE 16 as long as at least one of the coin tubes 31a to 31d of the change-giving device 12 still contains at least one 20-centime piece, and switches over to its other position only when all coin tubes are empty.

The contact y1 is controlled direct by the relay Y1 of the chain 6a. In the example considered, this relay is excited at the beginning of the transmission of the repayment impulses, whereby the contact y1 assumes the position shown in broken lines in FIGURE 16. It returns to its starting position after the transmission of the first impulse, and by each new repayment impulse is switched back into the position shown in broken lines; it thus acts as an impulse divider. The contact 10a is controlled direct by the impulse generator and after the transmission of the first repayment impulse switches out of the position indicated in solid lines in FIGURE 16 into the position shown in broken lines. At the beginning of the transmission of the repayment impulses, the relays of the chain 6a are, as described, all excited (FIGURE 9) with the exception of the relays X4 and Y4. The contact y1 of the feed circuit for the change-giving device 12 is situated in the position shown in broken lines in FIGURE 16.

The first repayment impulse has the effect that on the one hand the relays X1, Y1 to X3, Y3 drop and on the other hand the relays X4, Y4 are excited. In addition, this first impulse is conducted through the contacts 11^IV, g, y1, and 10a to the electromagnet 38 of the coin tube 31e. This has the consequence that the ejection device of this tube ejects a 10-centime piece, whereupon the contact 10a switches over into the position shown in broken lines. Through the second repayment impulse the relays X1, Y1 are excited, while the relays X4, Y4 remain excited; this impulse therefore does not effect the return of money, since the contact y1 is still situated in its position shown in solid lines. Through the third repayment impulse the entire storage value is cancelled and at the same time a 20-centime piece is ejected through the ejector of the coin tube 31b. The purchaser has thus been refunded the excess sum of 30 centimes inserted.

In addition, the repayment impulses operate a totalising counter 55 which records the amount ejected in the form of coins, and also a printing counter 54 which records on a list the sum ejected.

When the reserve of 20-centime pieces has been exhausted during the process of repayment, the relay G switches the contact g out of the position shown in a continuous line into the position shown in a broken line, so that all following impulses are now transmited by the contact g to the electromagnet 38 of the tube 31e or, when the latter is empty, to the magnet of the tube 31f. The change to be refunded is thus ejected in the form of 10-centime pieces.

After this repayment, supervising means (not illustrated) lock the repayment device 12 to prevent further operation, so that now tickets can be purchased only by insertion of the amount exactly corresponding to the price of the ticket. At the same time these supervising means operate indicator devices, for example in the office of a supervisor indicating that the reserve of 20-centime pieces is exhausted.

When the sum to be repaid to the purchaser consists of only one or more 20-centime pieces and includes no 10-centime pieces, the change-giver device then operates as follows:

It will be assumed that the price of the ticket is 6.30 francs and that the sum of 6.50 francs has been inserted.

Since the price relays 16' and 16'' control the excitation of the relays X1, Y1, to X3, Y3 of the chain 6a (FIGURE 10) and V3, W3 of the chain 6b (FIGURE 4), the insertion of a 5-franc piece and of a 1-franc piece effects the cancellation of the amount stored in the storage means 6b, as described above. The five impulses emitted by the generator 10 after the insertion of a 50-centime effect through the verification unit 11 a modification of the condition of excitation of the relays of the chain 6a, in such a manner that after the fifth impulse only the relays X2 and Y2 remain excited, which corresponds to the sum of 0.80 francs. In the manner described above the relays X4 and Y4 are therefore excited by the switch system 7, which corresponds to the amount of 0.20 francs to be ejected.

The generator 10 then commences the transmission of the repayment impulses. Since, contrarily to the case previously described, the relays X1 and Y1 are not excited and therefore the contact y1 is open (it assumes the position indicated by a solid line in FIGURE 16), only the second repayment impulse can be transmitted to the ejection unit of the coin tube 31c. In this way only one 20-centime piece is refunded. After two impulses (FIGURE 11) the storage means 6a is cancelled and the verification unit 11 at that moment interrupts the further transmission of impulses.

Although the example described relates to an automatic machine which can repay only amounts of at most 0.90 francs, the invention is naturally not restricted to this maximum repayment amount, but can be extended as desired in respect of the repayment capacity. This can in particular be effected by equipping the storage chains 6b and 6c with a similar switch system 7 to that illustrated in FIGURE 3. The change-giving device can also be equipped for higher coin value, for example 1.00, 2.00, or 5.00 francs. In a modification (not illustrated) the switch system 7 associated with the storage means 6a can also be formed by the relays of the storage means 6c and of the corresponding contacts, so that the storage means 6c is coupled in a suitable manner to the storage means 6a.

In respect of the individual structural elements and structural groups the invention is also not restricted to the example of its embodiment illustrated, but the principle according to the invention can also be embodied with other types of printing devices, for example self-inking printers, and also other types of change-giving devices.

What we claim is:

1. Automatic ticket selling machine comprising selector means to select a ticket; means to issue a selected ticket; storing means including a reversible electrical counter storing a representation of the value of the ticket selected by said selector means; coin insertion and counting means determining the value of coins inserted therein; an electrical impulse generator controlled by said coin counting means, said impulse generator being connected to said electrical counter and supplying pulses thereto, the number of which is representative of the value of inserted coins, as counted by said counting means, to decrement said counter by the value of the inserted coins; electrical sensing means connected to said counter and to said ticket issue means to detect full countdown of said counter to zero and cause issue of a ticket when the value of inserted coins equals the value of the selected ticket; and means for returning change if the value of inserted coins exceeds the value of the ticket, said change returning means including an electrical pulse actuated switching system actuated if impulses from said impulse generator are received after said detecting means have sensed countdown of said counter to zero, said switching system causing continued counting of said counter to set the correct amount of change into the counter; and a change coin returning device, said coin change returning device being controlled by further pulses from said impulse generator; said further pulses from said impulse generator simultaneously causing counting of said counter in reverse direction, said detecting means interrupting said impulse generator and said coin change returning device when said counter again reaches zero.

2. Machine as claimed in claim 1, including a plurality of groups of coin containers to hold reserve repayment coins, different groups being adapted to hold different types or denominations of coins, means operatively associated with said groups storing impulses from said impulse generator and ejecting a coin from the highest coin value group first; and means transferring the impulses to a lower value group upon detection of a stored value less than the value of said highest group, whereby the ejection of coins will be controlled in such a manner that the value of coins ejected corresponds to the sum to be repaid.

3. Machine as claimed in claim 2, wherein indicator means are provided to indicate the exhaustion of the reserve of one type of coin in any one group of coin containers.

4. Machine as claimed in claim 1, including a supervisory means associated with said coin counting means to prevent the issue of tickets when the amount inserted in the form of coins exceeds a predetermined excess above the price of the ticket, said supervisory means being further associated with said coin insertion means to cause return of the total amount of coins inserted when said supervisory means prevents issue of a ticket.

5. Machine as claimed in claim 1, wherein said coin change returning device includes a plurality of coin tubes, each having a spring biased coin ejector rod to eject the lowermost of a stack of coins in the tubes; a solenoid connected to said impulse generator operating said coin ejector rod to eject a coin each time an impulse is applied thereto; a pivotally mounted link having one end normally bearing against said coin ejector rod when said rod is in non-ejecting position and lightly bearing against coins in the stack other than the lowermost coin being subject to ejection and pivoting upon ejection of the next to the last coin; the other end of said link being operatively connected to a switchover means disconnecting said solenoid from said impulse generator and connecting said impulse generator to a solenoid associated with another coin tube capable of accepting pulses from said impulse generator.

6. In an automatic ticket selection and selling machine, a continuous, reversible counter storing the value of a selected ticket; coin value determining means; an electrical impulse generator controlled by said coin value determining means, said impulse generator being connected to said electrical counter and electrically decrementing said counter by applying electrical impulses thereto corresponding to the determined value of coins inserted in the machine; zero detecting means sensing countdown of said counter to zero; and means for determining the excess value of inserted coins over the value of a selected ticket, including means switching the counting sequence of said counter such that said counter will count beyond zero when impulses from said impulse generators are received after said zero detecting means have sensed countdown of said counter to zero, to set the correct amount of change into the counter and said change returning means, said change returning means being controlled by electrical impulses from said impulse generator, said impulse generator simultaneously incrementing said counter to zero, said detecting means interrupting said impulse generator and said change returning means when said counter again reaches zero.

7. In a machine as claimed in claim 6, means storing change coins and having a pulse operated coin ejection device; and means connecting said electrical impulse generator to said pulse operated ejection device and to said electrical counter upon the counter having once reached zero so as to reverse the counting of the counter, said zero detection device interrupting pulses to said coin ejection device and to said counter upon said zero detection device again sensing that the counter has again reached zero.

References Cited by the Examiner

UNITED STATES PATENTS

| 1,813,720 | 7/31 | Wilson | 194—7 X |
|---|---|---|---|
| 2,802,473 | 8/57 | Keefe | 133—2 |
| 3,004,541 | 10/61 | Erickson et al. | 194—10 X |

FOREIGN PATENTS 503,257 8/39 Great Britain.

LOUIS J. DEMBO, *Primary Examiner.*

SAMUEL F. COLEMAN, *Examiner.*